(12) United States Patent
Nakada et al.

(10) Patent No.: US 7,076,793 B1
(45) Date of Patent: Jul. 11, 2006

(54) PROGRAM GUIDE INFORMATION PRODUCING APPARATUS AND RELATED PROGRAM GUIDE INFORMATION COLLECTING/TRANSMITTING SYSTEM

(75) Inventors: Toru Nakada, Tokyo (JP); Takeshi Nagao, Kawaguchi (JP); Kenichi Fujita, Kawasaki (JP); Yoshiyasu Takeuchi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/512,306

(22) Filed: Feb. 24, 2000

(30) Foreign Application Priority Data

Feb. 25, 1999  (JP) ................................ 11-048090

(51) Int. Cl.
 G06F 3/00 (2006.01)
 G06F 13/00 (2006.01)
 H04N 5/445 (2006.01)

(52) U.S. Cl. ........................... 725/39; 725/48; 725/54; 725/114; 725/118; 725/144; 725/148

(58) Field of Classification Search .................. 725/32, 725/39, 48–50, 54, 59, 109, 114–117, 138, 725/144–147
See application file for complete search history.

(56) References Cited

U.S. PATENT DOCUMENTS

| | | | |
|---|---|---|---|
| 5,515,106 A | | 5/1996 | Chaney et al. |
| 5,576,755 A | | 11/1996 | Davis et al. |
| 5,576,775 A | * | 11/1996 | Bolle ........................... 351/62 |
| 5,579,055 A | * | 11/1996 | Hamilton et al. ............. 725/49 |
| 5,619,274 A | | 4/1997 | Roop et al. |
| 5,666,645 A | * | 9/1997 | Thomas et al. ................ 725/47 |
| 5,790,198 A | * | 8/1998 | Roop et al. .................... 725/48 |
| 5,841,433 A | * | 11/1998 | Chaney ......................... 725/50 |
| 5,956,455 A | * | 9/1999 | Hennig ......................... 386/83 |
| 6,020,880 A | * | 2/2000 | Naimpally .................... 725/48 |
| 6,085,253 A | * | 7/2000 | Blackwell et al. .......... 709/235 |
| 6,314,571 B1 | * | 11/2001 | Ogawa et al. ................ 725/48 |
| 6,442,755 B1 | * | 8/2002 | Lemmons et al. ............ 725/47 |
| 6,490,725 B1 | * | 12/2002 | Kikinis ......................... 725/87 |
| 6,510,555 B1 | * | 1/2003 | Tsurumoto .................... 725/92 |
| 6,769,128 B1 | * | 7/2004 | Knee et al. .................... 725/43 |

FOREIGN PATENT DOCUMENTS

| | | |
|---|---|---|
| EP | 0 721 253 A2 | 1/1996 |
| WO | WO 99/11061 | 3/1999 |
| WO | WO 99/43160 | 8/1999 |

* cited by examiner

*Primary Examiner*—Ngoc Vu
(74) *Attorney, Agent, or Firm*—Connolly Bove Lodge & Hutz LLP

(57) ABSTRACT

A program guide information producing apparatus outputs self-produced program guide information and other broadcaster's program guide information. In the program guide information producing apparatus, a common program guide information producing section generates self-produced common program guide information. Furthermore, a program guide information output section unites the self-produced common program guide information with other broadcaster's common program guide information received from a program guide information collecting/transmitting apparatus and outputs the united common program guide information. Thus, the self-produced common program guide information is surely output even when the program guide information collecting/transmitting apparatus or the like is in trouble.

8 Claims, 12 Drawing Sheets

FIG. 19

CLASSIFICATION OF PROGRAM GUIDE INFORMATION

| COMMON PROGRAM GUIDE INFORMATION<br><br>EXAMPLES:<br>*BRIEF EXPLANATION OF PROGRAM GUIDE TABLE<br>*AUDIO/VIDEO TAPE RECORDING RESERVATION FUNCTION | PROGRAM GUIDE INFORMATION COMMONLY TRANSMITTED BY ALL TRANSPORT STREAMS | SELF-PRODUCED COMMON PROGRAM GUIDE INFORMATION<br>---------DESCRIBING COMMON PROGRAM GUIDE INFORMATION RELATING TO SELF-PRODUCED PROGRAM CONTENTS |
|---|---|---|
| | | OTHER BROADCASTER'S COMMON PROGRAM GUIDE INFORMATION<br>--------DESCRIBING COMMON PROGRAM GUIDE INFORMATION RELATING TO OTHER BROADCASTER'S PROGRAM CONTENTS |
| INDIVIDUAL PROGRAM GUIDE INFORMATION<br><br>EXAMPLES:<br>*DETAILED EXPLANATION OF PROGRAM GUIDE TABLE<br>*PROGRAM DISPLAY OF SERIES DRAMA | PROGRAM GUIDE INFORMATION INDIVIDUALLY TRANSMITTED BY TRANSPORT STREAM OF EACH BROADCASTER | |

FIG. 20

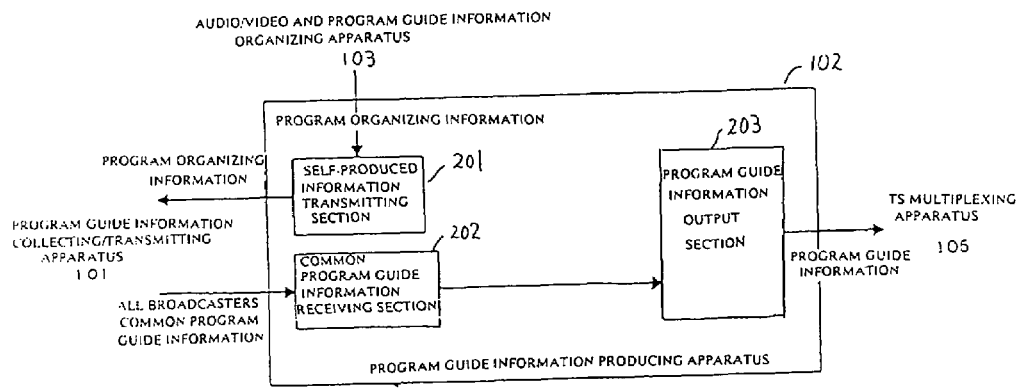

PROGRAM GUIDE INFORMATION PRODUCING APPARATUS AND RELATED PROGRAM GUIDE INFORMATION COLLECTING/TRANSMITTING SYSTEM

BACKGROUND OF THE INVENTION

The present invention relates to a broadcast system providing broadcast services in which program guide information is multiplexed with audio/video data. More specifically, the present invention relates to a program guide information collecting/transmitting system which transmits program guide information of each broadcaster to other broadcasters. Furthermore, the present invention relates to a program guide information producing apparatus of each broadcaster which produces the program guide information. Especially, the present invention assures reliable broadcasting of program guide information in each broadcaster even when the transmission of program guide information has failed.

A conventional television schedule information transmission and utilization system and process is disclosed in the U.S. Pat. No. 5,790,198 or in the U.S. Pat. No. 5,619,274.

In general, the digital broadcasting uses the MPEG2 technique to transmit audio/video signals. The MPEG2 technique is used for packet multiplexing a plurality of audio/video signals into a single transport stream (TS) which is aired. In this case, the transport stream (TS) includes program guide information in addition to audio/video data. More specifically, the program guide information is constituted by the PSI (Program Specific Information) for selecting the MPEG2 regulated programs and supplementary information (SI) required in constituting a program guide table (EPG) which is regulated by the ARIB (Association of Radio Industries and Business: which is an association for standardizing the domestic broadcasting system). The program guide table (EPG) is described in a sectional format table.

SUMMARY OF THE INVENTION

An object of the present invention is to a program guide information producing apparatus which is not adversely influenced by the troubles caused in the program guide information collecting/transmitting apparatus or the like, thereby assuring reliable transmission of common program guide information in each broadcaster. Furthermore, another object of the present invention is to provide a program guide information producing apparatus which is capable of quickly renewing the common program guide information in response to the sudden change of the broadcasting schedule. Moreover, another object to of the present invention is to provide a program guide information collecting/transmitting system incorporating the above-described program guide information producing apparatus.

The present invention constitutes a program guide information collecting/transmitting system in the following manner. Each broadcaster has a program guide information producing apparatus which generates self-produced common program guide information. The self-produced common program guide information is transmitted to a program guide information collecting/transmitting apparatus. The received self-produced common program guide information is transmitted from the program guide information collecting/transmitting apparatus to other broadcasters. Thus, each of other broadcasters receives the transmitted self-produced common program guide information produced by a different broadcaster.

The program guide information producing apparatus unites or combines the self-produced common program guide information produced by itself with other broadcaster's common program guide information received from the program guide information collecting/transmitting apparatus. The united common program guide information is output as all broadcasters' common program guide information.

Accordingly, it becomes possible to surely output the self-produced common program guide information even when the program guide information collecting/transmitting apparatus is in trouble.

Furthermore, the program guide information producing apparatus comprises a common program guide information storing section which stores the common program guide information corresponding to a designated date/time when the common program guide information is received from the program guide information collecting/transmitting apparatus. Furthermore, the program guide information producing apparatus comprises a version number adding section which adds a version number to common program guide information received from the program guide information collecting/transmitting apparatus. Accordingly, even when the program guide information collecting/transmitting apparatus is in trouble, it becomes possible to continuously output the common program guide information during the designated duration or to eliminate the version jump.

Furthermore, the program guide information producing apparatus comprises a self-produced information stepwise transmitting section which transmits control information prior to other information when renewed self-produced information is sent to the program guide information collecting/transmitting apparatus. The control information is used for audio/video tape recording preservation or the like in a broadcast receiver.

Accordingly, in each broadcast receiver, the audio/video tape recording reservation function can work properly even when the program guide information is suddenly changed.

According to a preferred embodiment, the present invention provides a program guide information producing apparatus for outputting self-produced program guide information and other broadcaster's program guide information, in which the program guide information producing apparatus comprises a common program guide information producing section which generates self-produced common program guide information. With this arrangement, it becomes possible to output the self-produced common program guide information even when the program guide information collecting/transmitting apparatus is in trouble.

According to a preferred embodiment, the present invention further provides a program guide information output section which unites the self-produced common program guide information with other broadcaster's common program guide information, and outputs the united common program guide information. With this arrangement, it becomes possible to unite the self-produced common program guide information with other broadcaster's common program guide information. Thus, it becomes possible to output the united common program guide information as all broadcasters' common program guide information. In this case, it is possible to continuously maintain the "Continuity Counter" which serves as an index of TS continuity.

According to a preferred embodiment, the present invention provides a program guide information producing apparatus for outputting self-produced program guide information and other broadcaster's program guide information, in which the program guide information producing apparatus comprises a common program guide information storing section which stores the common program guide information corresponding to a designated time duration in advance, the common program guide information being received from a program guide information collecting/transmitting apparatus or other broadcaster. With this arrangement, it becomes possible to continuously output the common program guide information during the designated duration even when any other broadcaster or the program guide information collecting/transmitting apparatus is in trouble.

According to a preferred embodiment, the present invention further provides a common program guide information storing section which stores the other broadcaster's common program guide information corresponding to a designated time duration in advance. With this arrangement, it becomes possible to output the other broadcaster's common program guide information during the designated duration even when any other broadcaster or the program guide information collecting/transmitting apparatus is in trouble.

According to a preferred embodiment, the present invention provides a program guide information producing apparatus for outputting self-produced program guide information and other broadcaster's program guide information, in which the program guide information producing apparatus comprises a self-produced information transmitting section which transmits only the information relating to broadcast time (length, time slot) of programs to a program guide information collecting/transmitting apparatus. With this arrangement, it becomes possible to promptly transmit the changed broadcast time of the program to each broadcast receiver in case of sudden change of the program guide information.

According to a preferred embodiment, the present invention provides a program guide information producing apparatus for outputting self-produced program guide information and other broadcaster's program guide information, in which the program guide information producing apparatus comprises a version number adding section which adds a version number to common program guide information received from a program guide information collecting/transmitting apparatus or other broadcaster. With this arrangement, it becomes possible to eliminate the version jump even when the acquirement of the common program guide information is failed due to the trouble caused in the network connecting the program guide information producing apparatus and the program guide information collecting/transmitting apparatus.

According to a preferred embodiment, the present invention further provides a version number adding section which adds a version number to the self-produced common program guide information produced by its own broadcaster and also to the other broadcaster's common program guide information received from the program guide information collecting/transmitting apparatus or other broadcaster. With this arrangement, it becomes possible to eliminate the version jump even when the acquirement of the other broadcaster's common program guide information is failed due to the trouble caused in the network connecting the program guide information producing apparatus and the program guide information collecting/transmitting apparatus.

According to a preferred embodiment, the present invention provides a program guide information producing apparatus for outputting self-produced program guide information and other broadcaster's program guide information, in which the program guide information producing apparatus comprises a self-produced information stepwise transmitting section which transmits control information prior to other information when renewed self-produced information is sent to a program guide information collecting/transmitting apparatus. In this case, the control information is used for audio/video tape recording preservation or the like in a broadcast receiver. With this arrangement, in each broadcast receiver, the audio/video tape recording reservation function can work properly even when the program guide information is suddenly changed.

According to a preferred embodiment, the present invention further provides a self-produced information stepwise transmitting section which transmits control information prior to other information when renewed self-produced information is sent to a program guide information collecting/transmitting apparatus. The control information is used for audio/video tape recording preservation or the like in a broadcast receiver. With this arrangement, in each broadcast receiver, the audio/video tape recording reservation function can work properly even when the program guide information is suddenly changed.

According to a preferred embodiment, the present invention causes the self-produced information stepwise transmitting section to transmit only the control information relating to a presently broadcasted program to the program guide information collecting/transmitting apparatus prior to others among the control information relating to the audio/video tape recording preservation or the like in the broadcast receiver. Thus, it becomes possible to transmit only the control information relating to the presently broadcasted program prior to other control information. In other words, it becomes possible to promptly transmit the high-priority program guide information to each broadcast receiver at an earlier timing.

According to a preferred embodiment, the present invention provides a program guide information producing apparatus for outputting self-produced program guide information and other broadcaster's program guide information, in which the program guide information producing apparatus comprises a self-produced information checking section which obtains and checks self-produced information stored in a program guide information collecting/transmitting apparatus after the self-produced information is transmitted to the program guide information collecting/transmitting apparatus. With this arrangement, it becomes possible to check whether or not the information has been accurately transmitted from the program guide information producing apparatus to the program guide information collecting/transmitting apparatus. Furthermore, it becomes possible to check whether or not the transmitted information has been modified or tampered by someone else.

According to a preferred embodiment, the present invention further provides a self-produced information checking section which obtains and checks the self-produced common program guide information stored in a program guide information collecting/transmitting apparatus after the self-produced common program guide information is transmitted to the program guide information collecting/transmitting apparatus. With this arrangement, it becomes possible to check whether or not the information has been accurately transmitted from the program guide information producing apparatus to the program guide information collecting/transmitting apparatus. Furthermore, it becomes possible to check whether or not the transmitted information has been modified or tampered by someone else.

According to a preferred embodiment, the present invention provides a program guide information collecting/transmitting system including a program guide information collecting/transmitting apparatus for transmitting program guide information to other broadcasters, wherein each broadcaster generates self-produced common program guide information and transmits the self-produced common program guide information to the program guide information collecting/transmitting apparatus. The program guide information collecting/transmitting apparatus transmits the received self-produced common program guide information of each broadcaster to other broadcasters. And, the other broadcasters receive the transmitted self-produced common program guide information of each broadcaster as common program guide information produced by a different broadcaster. With this embodiment, each broadcaster can unite or combine the self-produced common program guide information produced by itself with other broadcaster's common program guide information received from the program guide information collecting/transmitting apparatus. The united common program guide information is output as all broadcasters' common program guide information.

According to a preferred embodiment, the present invention provides a common program guide information storing section in the program guide information collecting/transmitting apparatus. The common program guide information storing section administrates the self-produced common program guide information transmitted from each broadcaster. With this arrangement, the program guide information collecting/transmitting apparatus can receive the common program guide information produced by each broadcaster and can administrate the all broadcasters' common program guide information.

According to a preferred embodiment, the present invention further improves the program guide information collecting/transmitting system. More specifically, each broadcaster transmits the self-produced common program guide information corresponding to a designated time duration to the program guide information collecting/transmitting apparatus. Then, the program guide information collecting/transmitting apparatus causes the common program guide information storing section to store the received self-produced common program guide information transmitted from each broadcaster during the designated time duration. With this arrangement, it becomes possible to continuously output the other broadcaster's common program guide information at least during the designated duration even when any other broadcaster is in trouble.

According to a preferred embodiment, the present invention provides a program guide information producing apparatus for outputting self-produced program guide information and other broadcaster's program guide information, in which the program guide information producing apparatus comprises an inter-station self-produced information transmitting section which directly transmits self-produced information to other broadcaster, and an inter-station common program guide information receiving section which directly receives common program guide information from other broadcasters. With this arrangement, it becomes possible to omit the program guide information collecting/transmitting apparatus. This makes it possible to reduce the operational cost such as the operator expenses required in using the program guide information collecting/transmitting apparatus.

According to a preferred embodiment, the present invention further provides an inter-station self-produced information transmitting section which directly transmits the self-produced common program guide information, and an inter-station common program guide information receiving section which directly receives the other broadcaster's common program guide information from the other broadcaster. With this arrangement, it becomes possible to omit the program guide information collecting/transmitting apparatus. This makes it possible to reduce the operational cost.

BRIEF DESCRIPTION OF THE DRAWINGS

The above and other objects, features and advantages of the present invention will become more apparent from the following detailed description which is to be read in conjunction with the accompanying drawings, in which:

FIG. 19 is a view showing the classification of program guide information; and

FIG. 20 is a block diagram schematically showing the arrangement of an original program guide information producing apparatus.

DESCRIPTION OF THE PREFERRED EMBODIMENTS

Digital Broadcasting System

Figure 18:
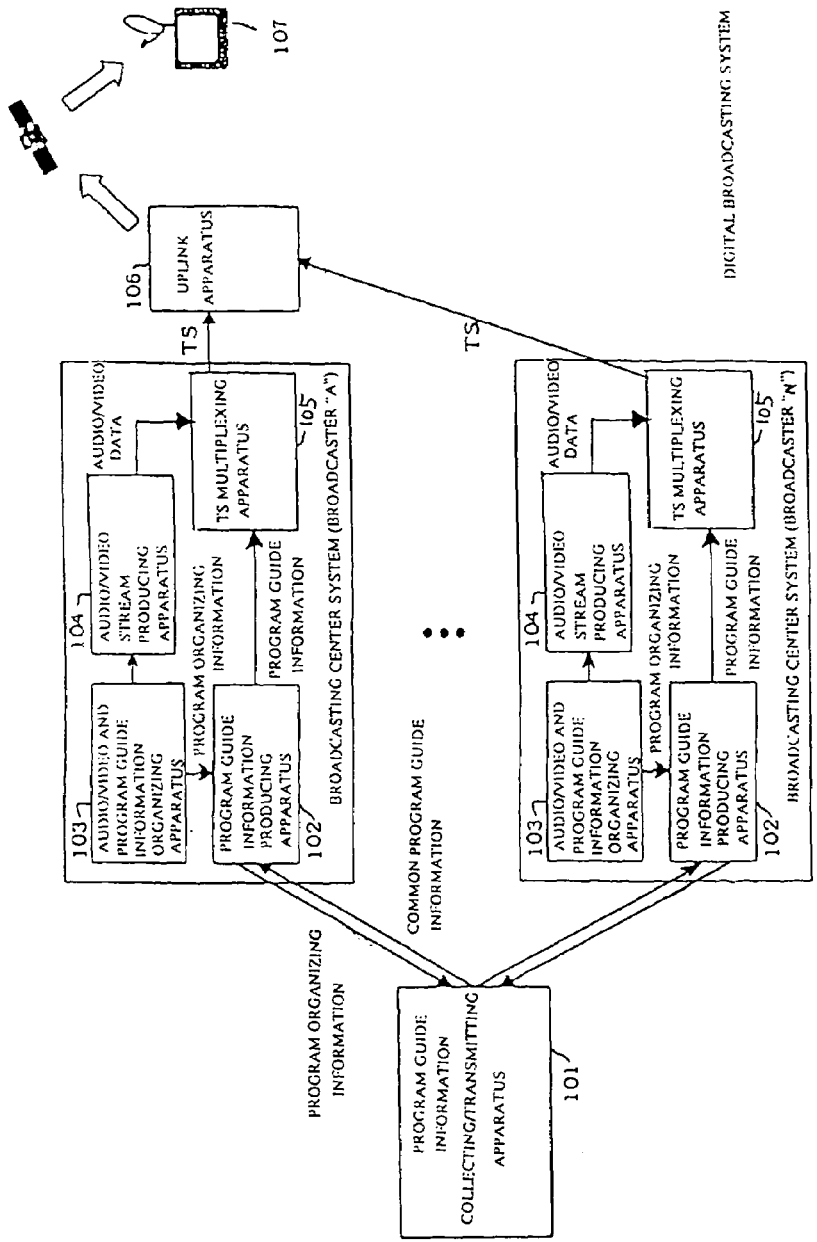
FIG. 18 is a block diagram schematically showing the arrangement of an original program guide information collecting/transmitting system.

FIG. 18 shows an original digital broadcasting system to which the present invention is applied. This digital broadcasting system comprises a plurality of broadcasting center systems (i.e., broadcasters "A" to "N"), a program guide information collecting/transmitting apparatus 101 which produces common program guide information based on program organizing information of each broadcaster, an uplink apparatus 106 which receives the audio/video information and the program guide information from each broadcaster and transmits radio waves carrying both the audio/video information and the program guide information, and each broadcast receiver 107 which receives the transmitted information.

Each broadcasting center system comprises an audio/video and program guide information organizing apparatus 103 which organizes the audio/video data and program guide information, an audio/video stream producing apparatus 104 which produces a stream of audio/video data, a program guide information producing apparatus 102 which receives the program organizing information from the audio/video and program guide information organizing apparatus 103 and outputs program guide information, and a TS multiplexing apparatus 105 which multiplexes the transport stream (TS) of audio/video data with the program guide information.

In each broadcaster, the audio/video and program guide information organizing apparatus 103 organizes the audio/video data of programs and the program guide information. The audio/video stream producing apparatus 104 is synchronous with the audio/video and program guide information organizing apparatus 103 to send the audio/video data to the TS multiplexing apparatus 105.

The program guide information producing apparatus 102 receives the program organizing information (i.e., original data for the program guide information) from the audio/video and program guide information organizing apparatus 103. Based on the received program organizing information, the program guide information producing apparatus 102 generates program guide information which includes the program specific information (PSI) required in selecting the audio/video data and the supplementary information (SI) required in constituting a program guide table.

The TS multiplexing apparatus 105 multiplexes the program guide information with the audio/video data and transmits the multiplexed TS to the uplink apparatus 106. When the digital broadcasting system includes a plurality of broadcast providers, the uplink apparatus 106 transmits radio waves carrying both the audio/video data and the program guide information received from all broadcasters. The broadcast receiver 107 receives the audio/video data and the program guide information transmitted from the uplink apparatus 106.

In this digital broadcasting system, to display the program guide table covering all broadcasters by using a single TS without forcing the broadcast receiver 107 to switch the TS (i.e., without changing the tuning), it is necessary that the TS transmitted from one broadcaster, e.g., broadcaster "A", needs to include the program guide information of other broadcasters. The program guide information commonly involved in TSs of all broadcasters is referred to as common grogram guide information. Meanwhile, the program guide information individually transmitted in its own TS from each broadcaster, for example during the spare time between programs, is referred to as individual program guide information. The program guide information producing apparatus 102 cannot produce the common program guide information covering all of the broadcasters based on only the self-produced program organizing information received from the audio/video and program guide information organizing apparatus 103.

The common program guide information can be classified into self-produced common program guide information and other broadcaster's common program guide information. FIG. 19 shows the common program guide information classified into self-produced program guide information and other broadcaster's common program guide information. The self-produced common program guide information describes the common program guide information relating to self-produced program contents. The other broadcaster's common program guide information describes the common program guide information relating to other broadcaster's program contents.

The program guide information collecting/transmitting apparatus 101 receives the program organizing information from the program guide information producing apparatus 102 of each broadcasting center system, produces the common program guide information covering all of the broadcasters, and returns the produced common program guide information to the program guide information producing apparatus 102 of each broadcasting center system.

As shown in FIG. 20, the program guide information producing apparatus 102 of each broadcasting center system comprises a self-produced information transmitting section 201 which transmits the self-produced program organizing information to the program guide information collecting/transmitting apparatus 101, a common program guide information receiving section 202 which receives the common program guide information covering all of the broadcasters (i.e., all broadcasters' common program guide information), and a program guide information output section 203 which transmits the common program guide information to the TS multiplexing apparatus 105.

The self-produced information transmitting section 201 receives the program organizing information from the audio/video and program guide information organizing apparatus 103 and transmits the received program organizing information to the program guide information collecting/transmitting apparatus 101. The common program guide information receiving section 202 receives the all broadcasters' common program guide information covering all of the broadcasters from the program guide information collecting/transmitting apparatus 101, and sends the received all broadcasters' common program guide information to the program guide information output section 203. The program guide information output section 203 transmits the received all broadcasters' common program guide information to the TS multiplexing apparatus 105. This arrangement makes it possible to display a program guide table (EPG) covering all of the broadcasters in each broadcast receiver 107 receiving the TS transmitted from a specific broadcaster (e.g., broadcaster "A"), without requiring the broadcast receiver 107 to switch the TS.

However, according to the digital broadcasting program guide information collecting/transmitting system shown in FIG. 18, a problem arises when the program guide information collecting/transmitting apparatus 101 is in trouble or when the network connecting each broadcasting center system to the program guide information collecting/transmitting apparatus 101 is in trouble. In such cases, each broadcaster cannot renew the common program guide information. If the trouble lasts long (e.g., when the effective broadcast time of the presently aired common program guide information expires), each broadcaster will be unable to output the common program guide information itself.

Furthermore, each broadcaster receives the all broadcasters' common program guide information covering all of the broadcasters after the program organizing information is once transmitted to the program guide information collecting/transmitting apparatus 101. Accordingly, another problem arises when the broadcasting schedule is suddenly changed due to extension of a sports event program or interruption by urgent or emergency news. In such cases, it is difficult to quickly renew the common program guide information in response to the sudden change of the broadcasting schedule. This will cause problems in each broadcast receiver 107, for example in the tuning operation and in the audio/video tape recording reservation or the like.

PREFERRED EMBODIMENTS OF PRESENT INVENTION

Hereinafter, preferred embodiments of the present invention will be explained with reference to FIGS. 1 to 17. Identical parts are denoted by the same reference numerals throughout the views.

First Embodiment

A first embodiment of the present invention provides a program guide information collecting/transmitting system in which each broadcaster generates self-produced common program guide information.

Figure 2:
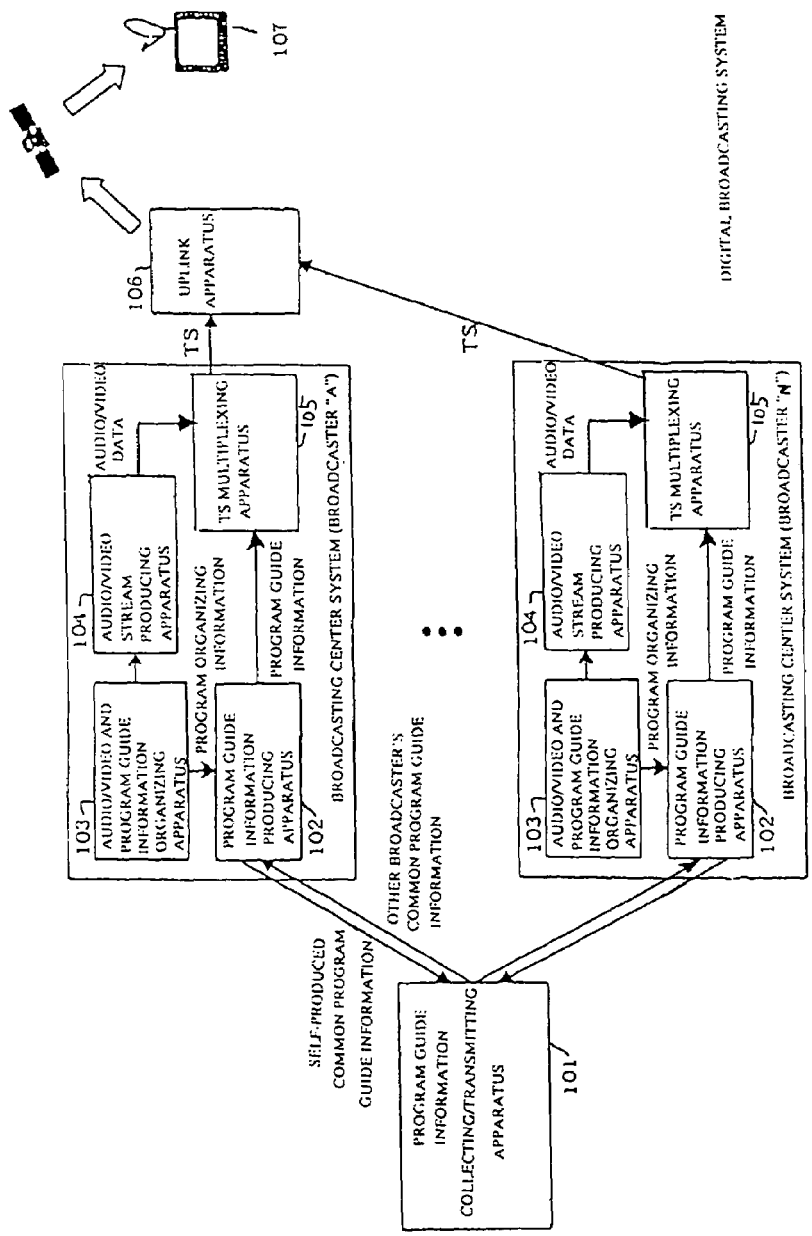
FIG. 2 is a block diagram schematically showing the arrangement of a program guide information collecting/transmitting system in accordance with the first embodiment of the present invention.

FIG. 2 shows a schematic arrangement of the program guide information collecting/transmitting system in accordance with the first embodiment of the present invention. The system shown in FIG. 2 differs from the original system (FIG. 18) in that the program guide information collecting/transmitting apparatus 101 receives the self-produced common program guide information from the program guide information producing apparatus 102 of each broadcasting center system. And, the program guide information collecting/transmitting apparatus 101 transmits other broadcaster's common program guide information to the program guide information producing apparatus 102 in each broadcasting center.

Figure 1:
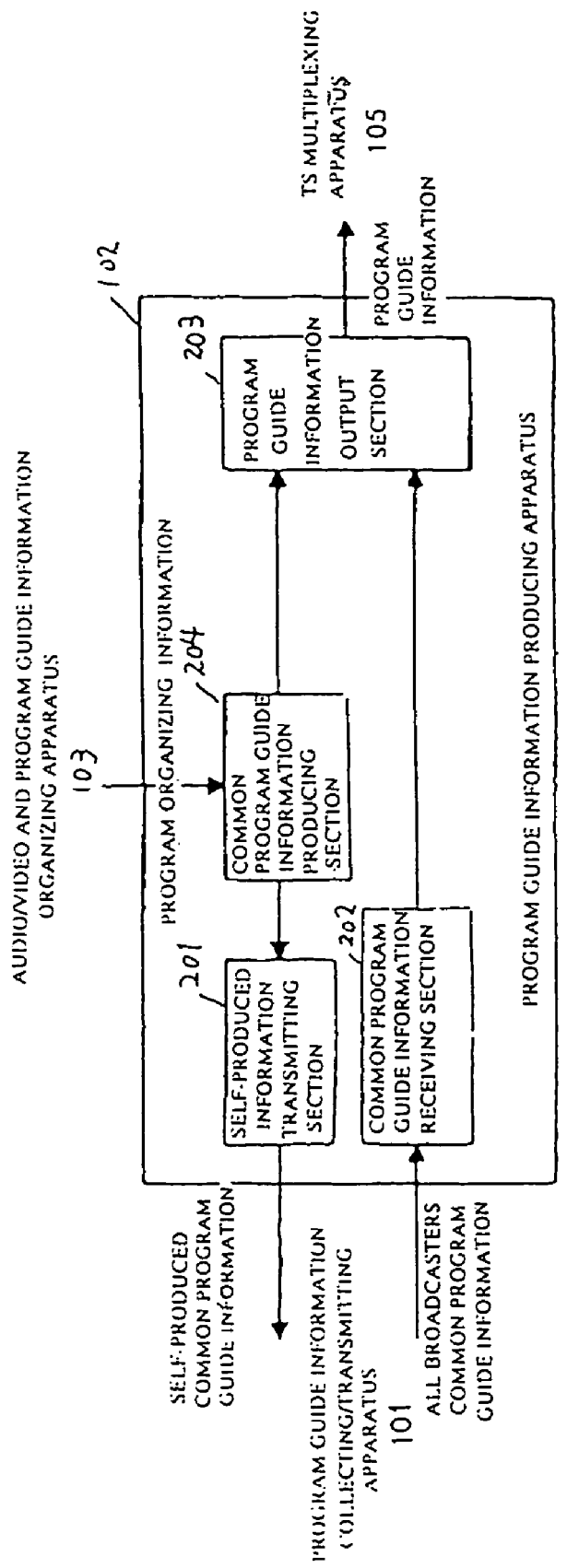
FIG. 1 is a block diagram schematically showing the arrangement of a program guide information producing apparatus in accordance with a first embodiment of the present invention.

FIG. 1 shows a schematic arrangement of the program guide information producing apparatus 102. The program guide information producing apparatus 102 comprises a common program guide information producing section 204 which receives the program organizing information from an audio/video and program guide information organizing apparatus 103. The common program guide information producing section 204 generates self-produced common program guide information based on the received program organizing information. The self-produced common program guide information is sent from the common program guide information producing section 204 to a self-produced information transmitting section 201. The self-produced information transmitting section 201 transmits the self-produced common program guide information to the program guide information collecting/transmitting apparatus 101. The program guide information producing apparatus 102 further comprises a common program guide information receiving section 202 which receives other broadcaster's common program guide information from the program guide information collecting/transmitting apparatus 101. A program guide information output section 203 receives the self-produced common program guide information from the common program guide information producing section 204 and also receives the other broadcaster's common program guide information from the common program guide information receiving section 202. The program guide information output section 203 outputs the received program guide information to a TS multiplexing apparatus 105 at predesignated time intervals.

The program organizing information, entered to the common program guide information producing section 204, includes the program related or channel related information, such as program ID, program name, program start/end time and program length. The common program guide information producing section 204 generates the self-produced common program guide information based on the received program organizing information. The program guide information, produced by the common program guide information producing section 204, has a transmission format described in a sectional format table regulated by the MPEG2 or ARIB technique. The transmission format consists of the PSI for selecting the audio/video data and SI for constituting the program guide table.

In this manner, each broadcaster generates self-produced common program guide information and transmits the produced self-produced common program guide information to the program guide information collecting/transmitting apparatus 101. Thus, the program guide information collecting/transmitting apparatus 101 collects the common program guide information transmitted from all broadcasters, and transmits other broadcaster's common program guide information to each broadcaster. For example, the broadcaster "A" receives other broadcaster's common program guide information covering all broadcasters other than the broadcaster "A."

In this manner, the common program guide information is substantially separated or classified into the self-produced common program guide information and the other broadcaster's common program guide information. The common program guide information producing section 204 generates the self-produced common program guide information produced by itself. Thus, even when the program guide information collecting/transmitting apparatus 101 or the like is in trouble, it becomes possible to surely produce and output at least the self-produced common program guide information. Thus, each broadcaster's TS can surely include at least the self-produced common program guide information without being adversely influenced by the troubles caused in other systems.

Furthermore, the program guide information output section 203 outputs the united program guide information including both the self-produced common program guide information and the other broadcaster's common program guide information. Thus, in the transmission of the common program guide information covering all of the broadcasters, it becomes possible to continuously maintain the "Continuity Counter" which serves as an index of TS packet continuity. In general, the "Continuity Counter" is located at the header portion of the TS packet together with PID and others. Accordingly, each broadcast receiver 107 can surely obtain the TS packet relating to all broadcasters' common program guide information.

As explained in a later-described sixth embodiment, the program guide information producing apparatus 102 may directly receive other broadcaster's common program guide information from other broadcasting center system. In such a case, the obtained other broadcaster's common program guide information is united with the self-produced common program guide information produced by its own broadcaster. The united common program guide information is output from the program guide information output section 203.

Second Embodiment

A program guide information collecting/transmitting system in accordance with a second embodiment of the present invention stores common program guide information corresponding to a predetermined date/time in advance so as to overcome the problem caused by the troubles.

Figure 3:
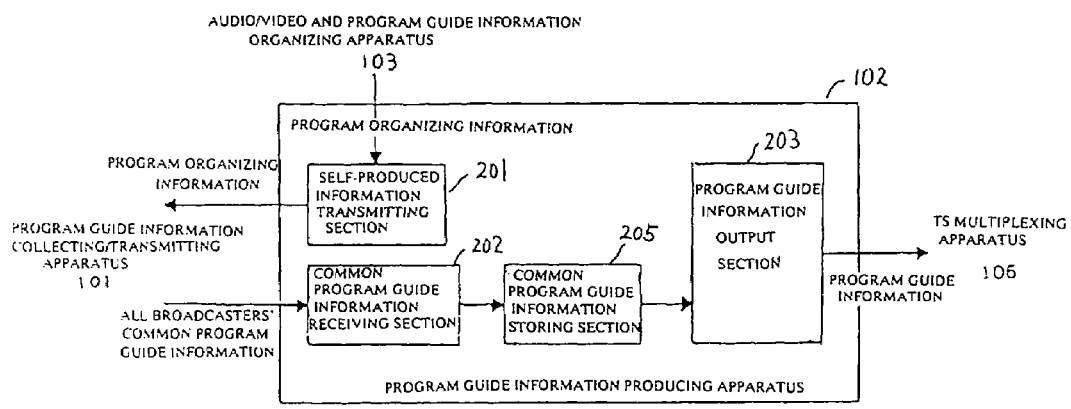
FIG. 3 is a block diagram schematically showing the arrangement of a program guide information producing apparatus in accordance with a second embodiment of the present invention.

FIG. 3 shows a program guide information producing apparatus 102 of the second embodiment which differs from the program guide information producing apparatus 102 shown in FIG. 20 (original system) in that an additionally provided section is a common program guide information storing section 205 which stores all broadcasters' common program guide information (i.e., the common program guide information covering all of the broadcasters).

Figure 4:
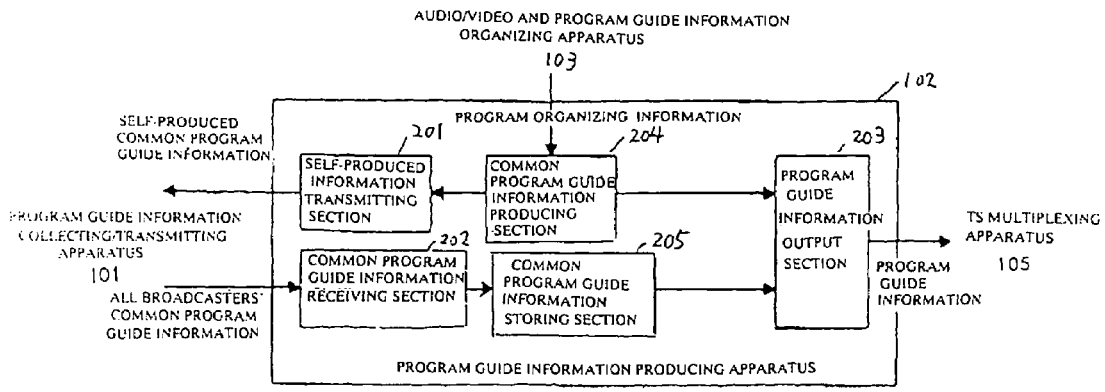
FIG. 4 is a block diagram schematically showing the arrangement of another program guide information producing apparatus in accordance with the second embodiment of the present invention.

FIG. 4 shows another program guide information producing apparatus 102 of the second embodiment which differs from the program guide information producing apparatus 102 shown in FIG. 1 (first embodiment) in that an additionally provided section is a common program guide information storing section 205 which stores other broadcasters' common program guide information (i.e., the common program guide information covering other broadcasters).

In the program guide information producing apparatus 102, the common program guide information storing section 205 stores the all broadcasters' common program guide information or other broadcaster's common program guide information received from the program guide information collecting/transmitting apparatus 101 via the common program guide information receiving section 202. The common program guide information storing section 205 sends the stored common program guide information to the program guide information output section 203. At designated time intervals, the program guide information output section 203 outputs both the self-produced common program guide information and other broadcaster's common program guide information.

Figure 5:
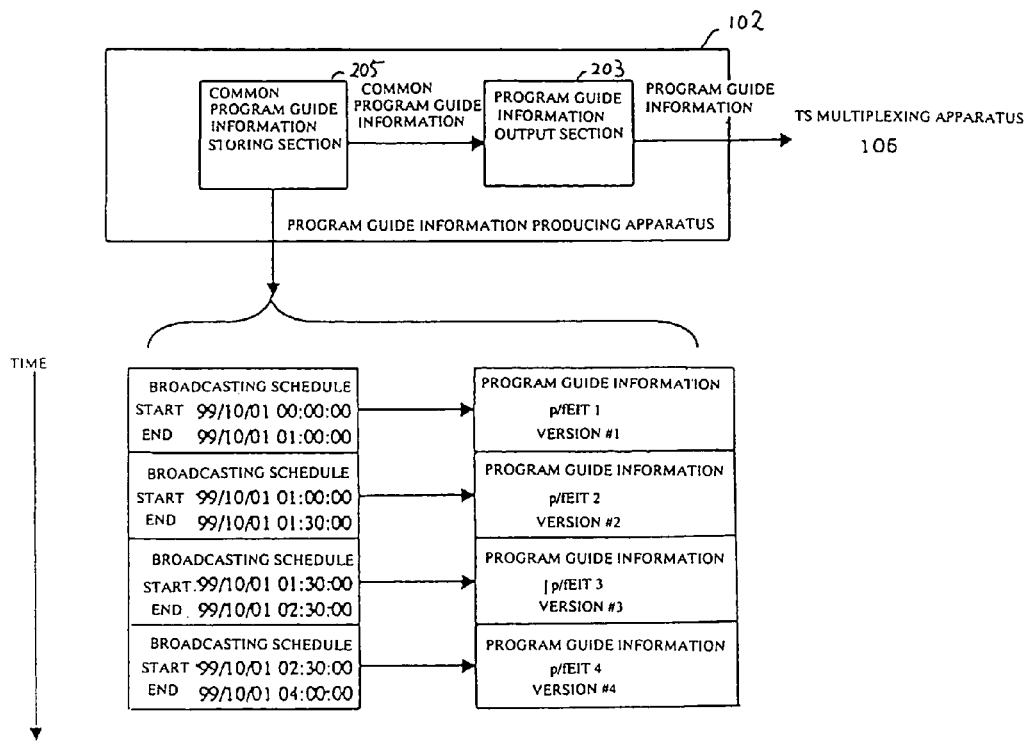
FIG. 5 is a view explaining program guide information stored in a common program guide information storing section of the program guide information producing apparatus in accordance with the second embodiment of the present invention.

FIG. 5 shows the common program guide information stored in the common program guide information storing section 205. More specifically, the common program guide information storing section 205 administrates individual program guide information and broadcasting schedule information sent from the program guide information collecting/transmitting apparatus 101. The broadcasting schedule information describes the broadcast time (length, time slot) of individual programs.

In FIG. 5, p/fEIT (present/following EIT) is one example of the sectional format table, which describes the program guide information relating to the presently broadcasted program and a following program which is to be next broadcasted. The p/fEIT information is used in the broadcast receiver 107 for displaying a program table of different channels' programs or for the audio/video tape recording control of the reserved programs.

Furthermore, a version number shown in FIG. 5 is used in device controls of the broadcast receiver 107. The version number is incremented in response to every renewal of the program guide information. Thus, the broadcast receiver 107 refers to the version number to check whether or not the program guide information has been renewed. The broadcast receiver 107 obtains the renewed program guide information (i.e., sectional format table) when the version number is incremented. According to the example shown in FIG. 5, the program guide information output section 203 outputs p/fEIT1 of version #1 at designated time intervals for a time duration from 1999/10/01, 00:00:00 to 1999/10/01, 01:00:00. Furthermore, the program guide information output section 203 outputs p/fEIT2 of version #2 at designated time intervals for a time duration from 1999/10/01, 01:00:00 to 1999/10/01, 01:30:00.

In this manner, the program guide information producing apparatus 102 has the common program guide information storing section 205 which stores the common program guide information (i.e., p/fEIT according to FIG. 5 example) for a designated date/time (several hours to several days) in advance. Therefore, even when acquisition of all broadcasters' common program guide information or other broadcasters' common program guide information is failed due to the trouble caused in any other broadcasting center system and/or the program guide information collecting/transmitting apparatus 101, it becomes possible to continuously output the pre-stored common program guide information for the predesignated time period in accordance with the predetermined broadcasting schedule.

Figure 6:
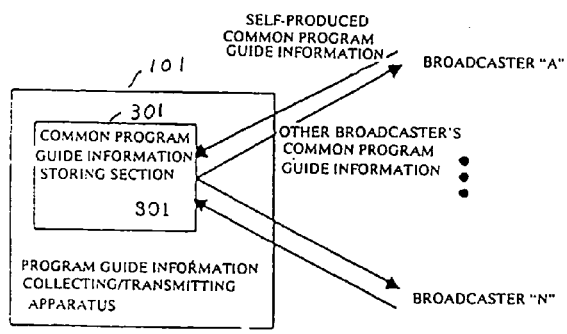
FIG. 6 is a block diagram schematically showing the arrangement of a program guide information collecting/transmitting apparatus in accordance with the second embodiment of the present invention.

FIG. 6 shows another example of the program guide information collecting/transmitting apparatus 101 which comprises a common program guide information storing section 301. The common program guide information storing section 301 stores the common program guide information corresponding to a designated date/time sent from each broadcaster. According to this arrangement, in the program guide information collecting/transmitting apparatus 101, the common program guide information storing section 301 receives, stores and administrates the self-produced common program guide information sent from each broadcasting center system.

In this manner, providing the common program guide information storing section 301 in the program guide information collecting/transmitting apparatus 101 makes it possible for the program guide information producing apparatus 102 in each broadcasting center system to receive the other broadcaster's program guide information from the program guide information collecting/transmitting apparatus 101 even when the transmission route is temporarily troubled between a specific broadcasting center system and the program guide information collecting/transmitting apparatus 101. Thus, the program guide information producing apparatus 102 can surely output the all broadcasters' common program guide information.

When the program guide information producing apparatus 102 directly receives other broadcaster's common program guide information from each broadcasting center system, the obtained other broadcaster's common program guide information is stored in the common program guide information storing section 205 and sent to the program guide information output section 203.

Third Embodiment

A program guide information collecting/transmitting system in accordance with a third embodiment of the present invention comprises a program guide information producing apparatus which assigns a version number to all broadcasters' common program guide information or to other broadcasters' common program guide information.

As explained in the second embodiment, the broadcast receiver 107 refers to the version number to check whether or not the program guide information has been renewed. When the version number is incremented by one, it means that the program guide information has been renewed once. Thus, the broadcast receiver 107 obtains the renewed program guide information. However, when the version number is incremented by two at a time, the broadcast receiver cannot obtain the program guide information. No renewal of program guide information is performed. This is referred as "version jump."

The version jump occurs when each broadcasting center system fails to obtain other broadcaster's common program guide information due to the trouble caused in the program guide information collecting/transmitting apparatus 101 or the network. Thus, there is the possibility that the version jump may occur in the case where assignment of the version number to other broadcaster common program guide information is done by the program guide information collecting/transmitting apparatus 101 or any other broadcasting center system.

For example, it is supposed that a broadcasting center system fails to obtain other broadcaster's common program guide information of version number 2. And later, this broadcasting center system may obtain other broadcaster's common program guide information of version number 3. In such a case, the broadcast receiver 107 receives the other broadcaster's common program guide information whose version number was increased by 2 at a time. In other words, the version jump occurs.

Figure 7:
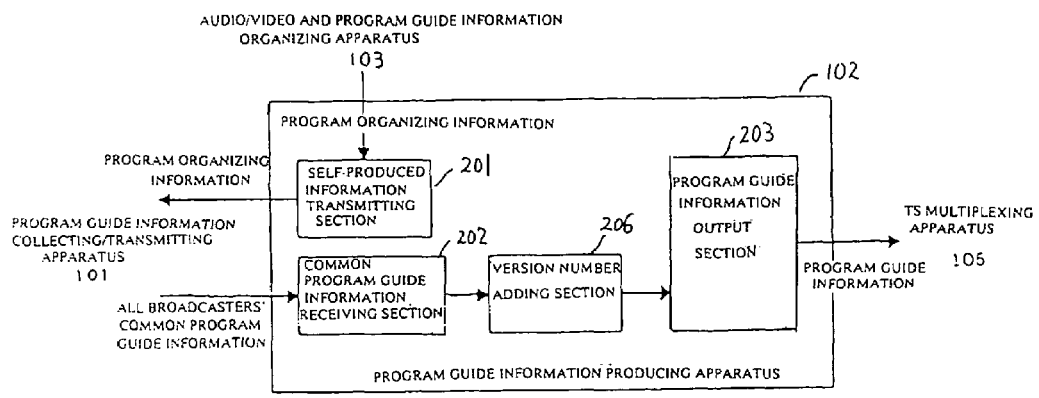
FIG. 7 is a block diagram schematically showing the arrangement of a program guide information producing apparatus in accordance with a third embodiment of the present invention.
Figure 8:
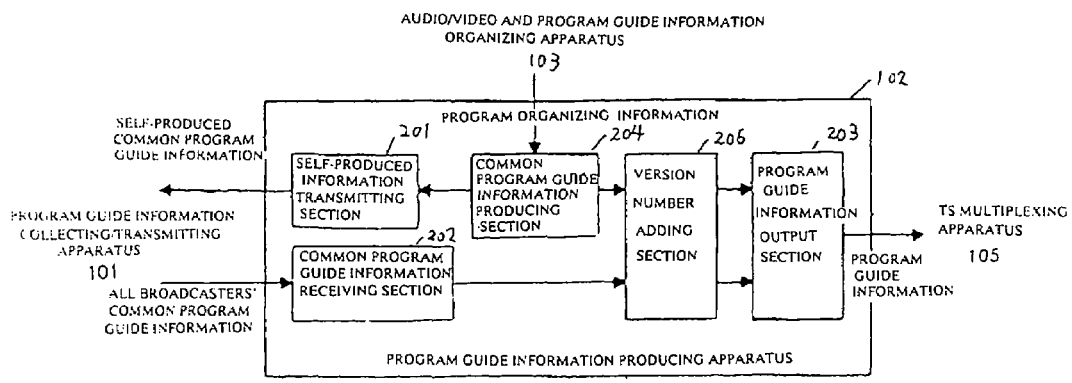
FIG. 8 is a block diagram schematically showing the arrangement of another program guide information producing apparatus in accordance with the third embodiment of the present invention.

FIG. 7 shows a program guide information producing apparatus 102 of the third embodiment which differs from the program guide information producing apparatus 102 shown in FIG. 20 (original system) in that a version number adding section 206 is provided. FIG. 8 shows another program guide information producing apparatus 102 of the third embodiment which differs from the program guide information producing apparatus 102 shown in FIG. 1 (first embodiment) in that the version number adding section 206 is provided.

Figure 9:
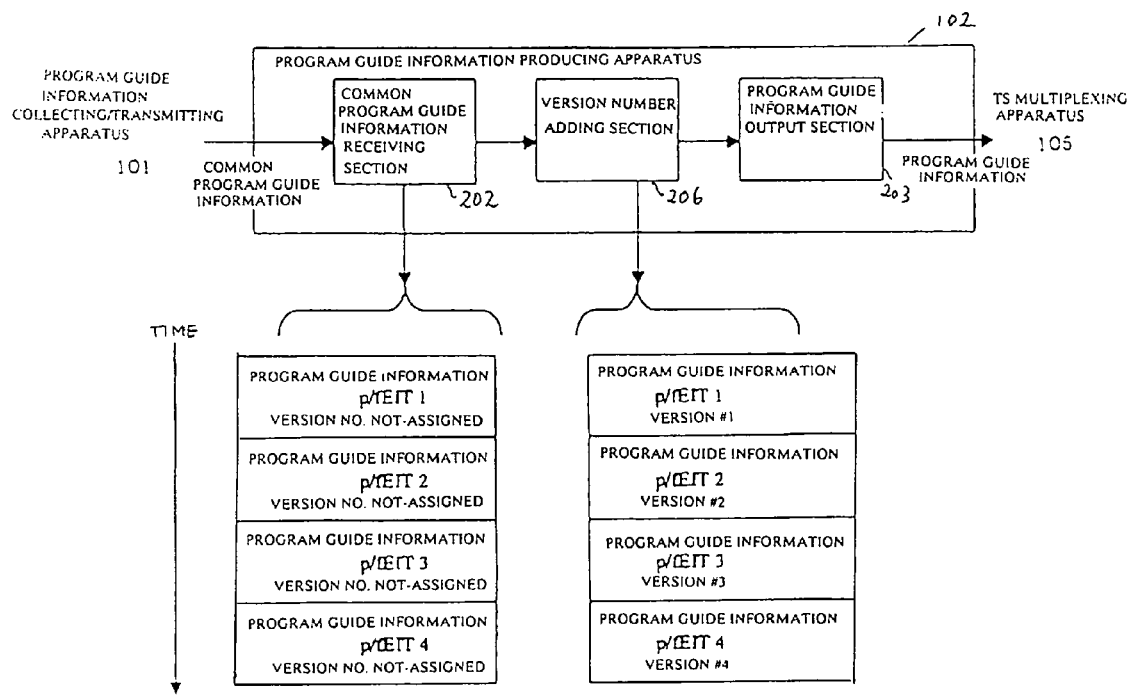
FIG. 9 is a view explaining version numbers assigned by a version number adding section of the program guide information producing apparatus in accordance with the third embodiment of the present invention.

As shown in FIG. 9, the version number adding section 206 assigns a version number to every common program guide information which has no version number yet when entered. The version number adding section 206 sends the common program guide information having an assigned version number to the program guide information output section 203. In this manner, the version number adding section 206 assigns the version number to the common program guide information immediately before the common program guide information is output. Thus, it becomes possible to surely suppress the version jump.

As described above, the program guide information producing apparatus 102 comprises the version number adding section 206 which assigns version numbers to all broadcasters' common program guide information and also to other broadcaster's common program guide information. Accordingly, it becomes possible for every broadcast receiver 107 to avoid the version jump even when the program guide information collecting/transmitting apparatus 101 or the network is in trouble.

Fourth Embodiment

A program guide information collecting/transmitting system in accordance with a fourth embodiment of the present invention comprises a program guide information producing apparatus 102 which is responsive to renewal of self-produced common program guide information so as to transmit high-priority information prior to low-priority information among the renewed self-produced common program guide information when the renewed self-produced common program guide information is transmitted to the program guide information collecting/transmitting apparatus 101.

Figure 10:
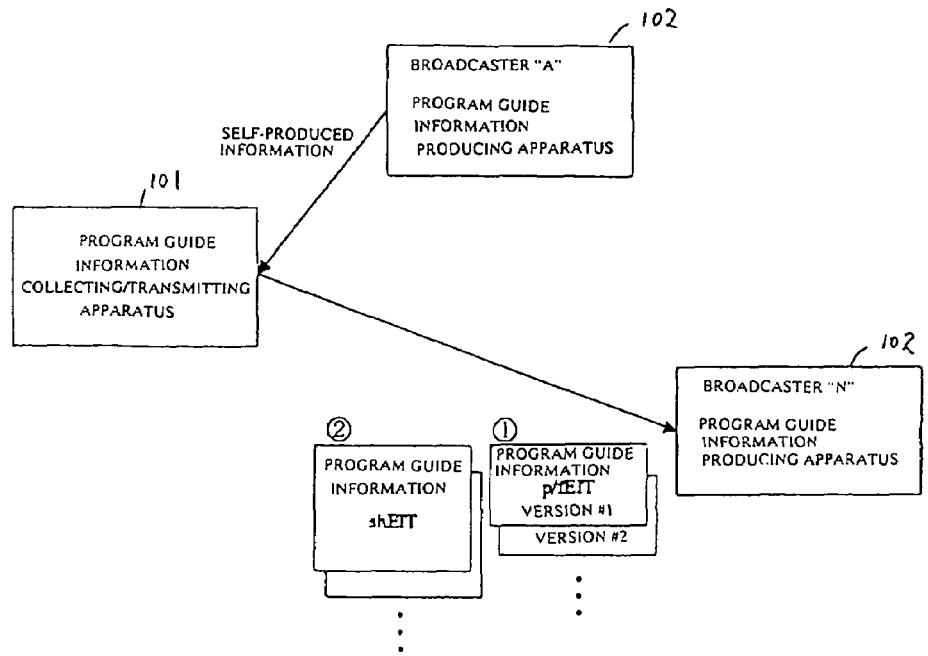
FIG. 10 is a view explaining the transmission order of program guide information in the program guide information collecting/transmitting system in accordance with a fourth embodiment of the present invention.

FIG. 10 is a schematic view showing a stepwise transmission of self-produced common program guide information in order of priority from the broadcaster "A" to the program guide information collecting/transmitting apparatus 101.

In FIG. 10, p/fEIT describes the program guide information relating to the presently broadcasted program and a following program which is to be next broadcasted, as explained in the second embodiment. Meanwhile, shEIT (scheduleEIT) is a sectional format table which describes the program guide information of a pre-designated time duration (e.g., one week). The shEIT information is used in the broadcast receiver 107 for displaying a long-term program table.

The broadcaster "A" modifies both p/fEIT and shEIT when it changes the program guide information of a certain program, and transmits the modified EIT information to the program guide information collecting/transmitting apparatus 101. The p/fEIT information is used to control the audio/video tape recording preservation or the like in each broadcast receiver 107. When the program change is too urgent, there is the possibility that p/fEIT may not arrive in time at the broadcaster "N." In such a case, a trouble will arise in the audio/video tape recording function of the broadcast receiver 107. To solve this problem, in the transmission of EIT-related information to the program guide information collecting/transmitting apparatus 101, the broadcaster "A" transmits the information relating to p/fEIT first and then transmits the information relating to shEIT later.

Figure 11:
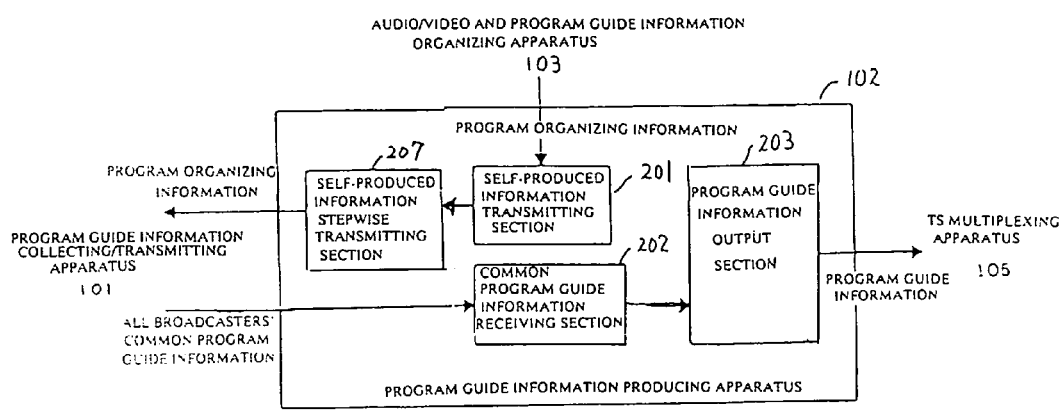
FIG. 11 is a block diagram schematically showing the arrangement of a program guide information producing apparatus in accordance with the fourth embodiment of the present invention.
Figure 12:
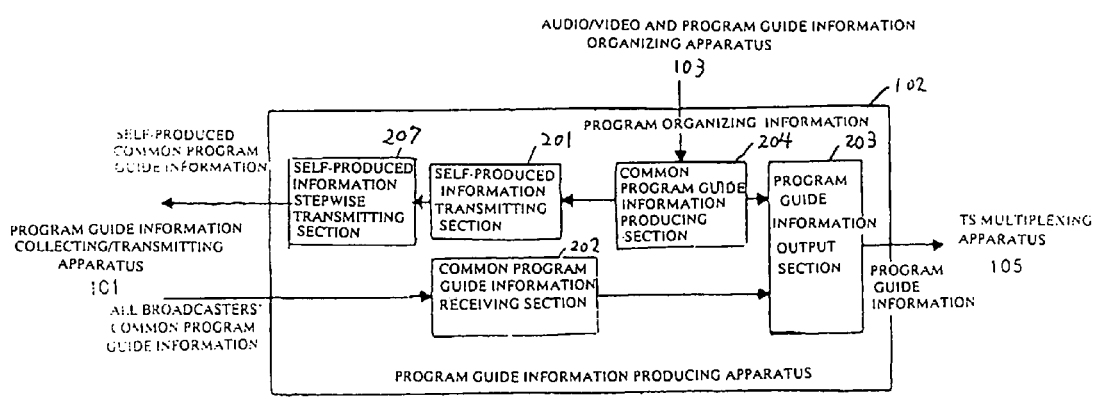
FIG. 12 is a block diagram schematically showing the arrangement of another program guide information producing apparatus in accordance with the fourth embodiment of the present invention.

FIG. 11 shows a program guide information producing apparatus 102 of the fourth embodiment which differs from the program guide information producing apparatus 102 shown in FIG. 20 (original system) in that a self-produced information stepwise transmitting section 207 which transmits self-produced information in a stepwise manner. FIG. 12 shows another program guide information producing apparatus 102 of the fourth embodiment which differs from the program guide information producing apparatus 102 shown in FIG. 1 (first embodiment) in that the self-produced information stepwise transmitting section 207 is added.

The self-produced information stepwise transmitting section 207 transmits program organizing information or self-produced common program guide information to the program guide information collecting/transmitting apparatus 101 in the following order.

First, only p/fEIT, i.e., self-produced common program guide information, is sent to the program guide information collecting/transmitting apparatus 101. As shown in FIG. 10, the p/fEIT information having a relatively small data volume is sent first and the shEIT information having a relatively large data volume is sent later. With this arrangement, it becomes possible to transmit only p/fEIT to the broadcaster "N" at an earlier timing. This is effective to eliminate the trouble in the audio/video tape recording function or the like of the broadcast receiver 107.

Figure 13:
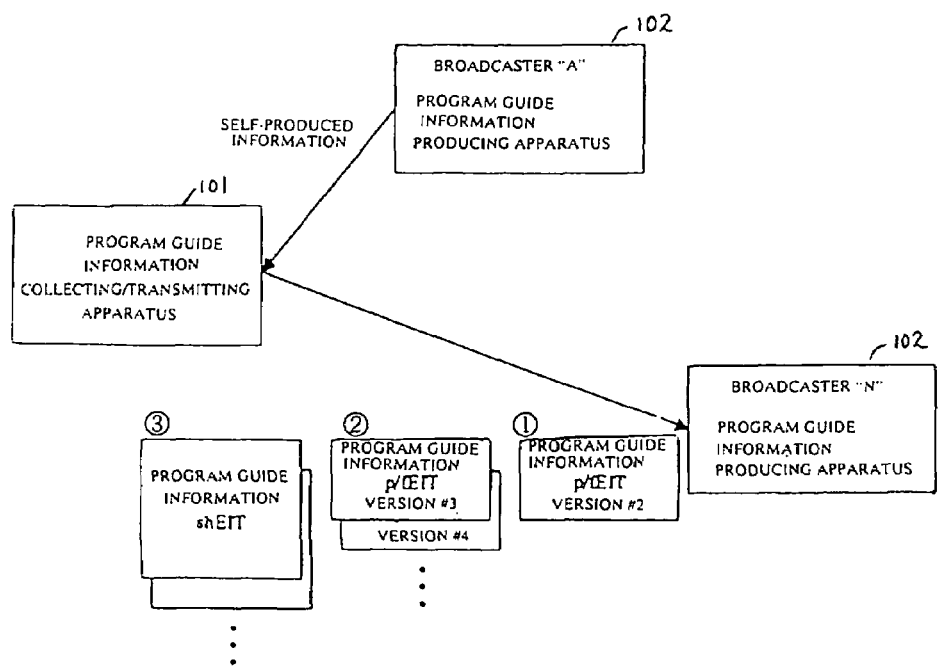
FIG. 13 is a view explaining another transmission order of program guide information in the program guide information collecting/transmitting system in accordance with the fourth embodiment of the present invention.

FIG. 13 is a schematic view showing another stepwise transmission of self-produced common program guide information in order of priority from the broadcaster "A" to the program guide information collecting/transmitting apparatus 101. More specifically, among the p/fEIT information (i.e., self-produced common program guide information), only the p/fEIT information relating to the presently broadcasted program (i.e., p/fEIT of the present version) is sent first to the program guide information collecting/transmitting apparatus 101. As shown in FIG. 13, the first transmitted information is the p/fEIT (version #2) relating to the presently broadcasted program. The next transmitted information is the p/fEIT (version #3) relating to the next broadcasted program and the remaining p/fEITs. The finally transmitted information is shEIT. With this arrangement, it becomes possible to more quickly transmit the p/fEIT of the presently broadcasted program to the broadcaster "N" in response to an urgent change of the program guide information.

Furthermore, when only the broadcast time (length, time slot) of the program is changed, the self-produced information transmitting section 201 transmits only the program guide information relating to the broadcast time (length, time slot) among the self-produced common program guide information to the program guide information collecting/transmitting apparatus 101. This makes it possible to quickly transmit the change in the broadcast time of the program to the program guide information producing apparatus of other broadcaster.

Fifth Embodiment

A program guide information collecting/transmitting system in accordance with a fifth embodiment of the present invention comprises a program guide information producing apparatus 102 which has the capability of checking whether or not correct self-produced program guide information has been transmitted from the program guide information collecting/transmitting apparatus 101.

Figure 14:
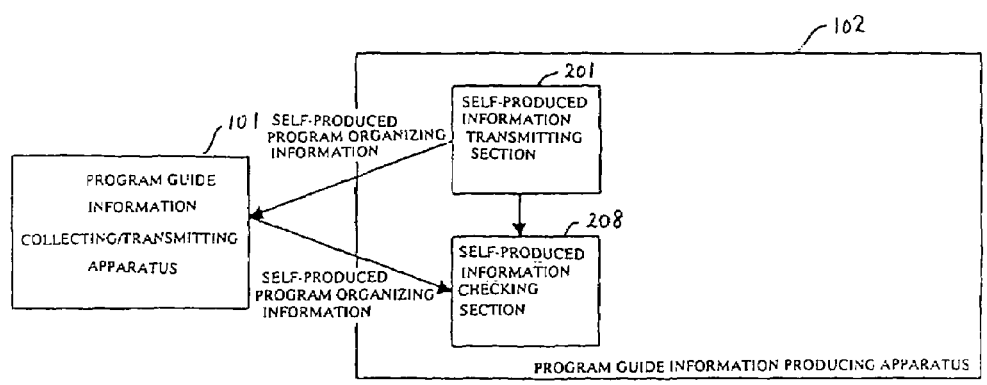
FIG. 14 is a block diagram schematically showing the arrangement of a program guide information producing apparatus in accordance with a fifth embodiment of the present invention.
Figure 15:
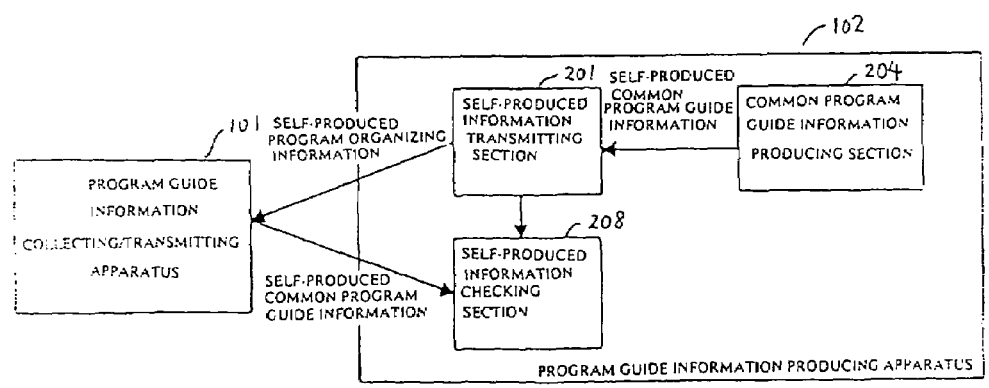
FIG. 15 is a block diagram schematically showing the arrangement of another program guide information producing apparatus in accordance with the fifth embodiment of the present invention.

FIG. 14 shows a program guide information producing apparatus 102 of the fifth embodiment which differs from the program guide information producing apparatus 102 shown in FIG. 20 (original system) in that a self-produced information checking section 208 is added, although FIG. 14 does not show the common program guide information receiving section 202 and the program guide information output section 203. FIG. 15 shows another program guide information producing apparatus 102 of the fifth embodiment which differs from the program guide information producing apparatus 102 shown in FIG. 1 (first embodiment) in that the self-produced information checking section 208 is added, although FIG. 15 does not show the common program guide information receiving section 202 and the program guide information output section 203.

The self-produced information checking section 208 obtains the self-produced information stored in the program guide information collecting/transmitting apparatus 101, and checks whether or not the self-produced information has been correctly transmitted from the self-produced information transmitting section 201 to the program guide information collecting/transmitting apparatus 101.

Accordingly, providing the self-produced information checking section 208 in the program guide information producing apparatus 102 makes it possible to check whether or not the self-produced common program guide information or the self-produced program organizing information has been correctly transmitted to the program guide information collecting/transmitting apparatus 101, or makes it possible to check whether or not the self-produced common program guide information has been modified or tampered by someone else.

Sixth Embodiment

A program guide information collecting/transmitting system in accordance with a sixth embodiment of the present invention comprises no program guide information collecting/transmitting apparatus 101. According to the sixth embodiment, the program guide information producing apparatus of each broadcaster directly transmits and receives the program guide information to and from the program guide information producing apparatus of another broadcaster.

Figure 16:
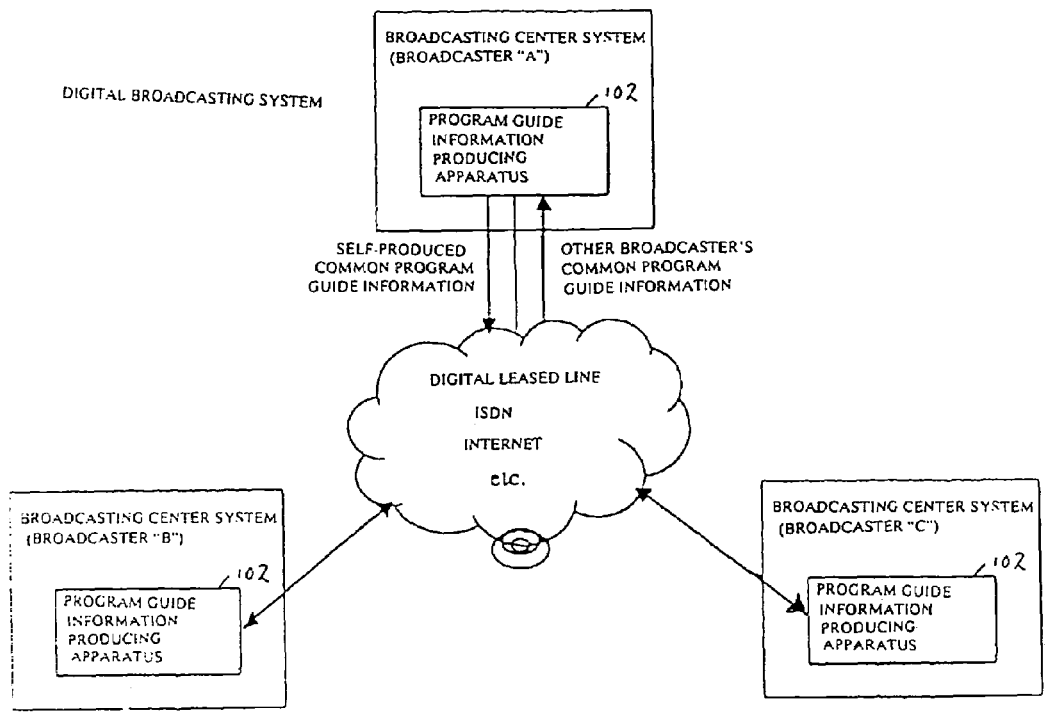
FIG. 16 is a block diagram schematically showing the arrangement of a program guide information collecting/transmitting system in accordance with a sixth embodiment of the present invention.

FIG. 16 shows a schematic view showing a digital broadcasting system in accordance with the sixth embodiment of the present invention. According to this system, each broadcasting center system includes a program guide information producing apparatus 102 which generates self-produced common program guide information and directly transmits or receives the self-produced common program guide information to or from the program guide information producing apparatus 102 of other broadcasting center system via digital leased line, ISDN, Internet or the like.

Figure 17:
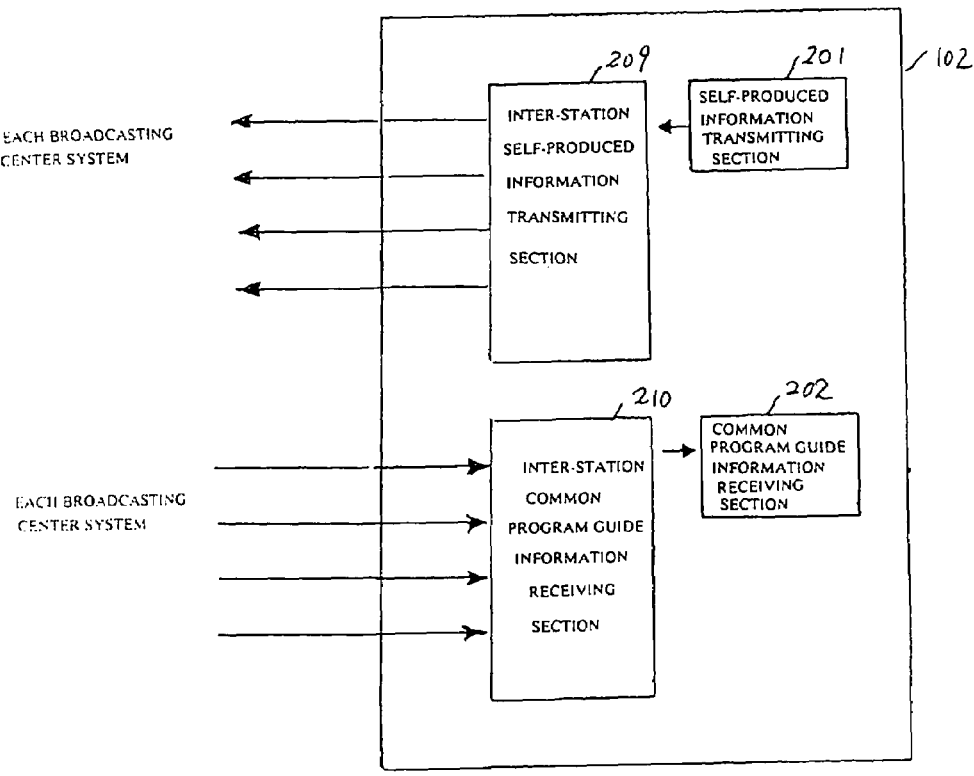
FIG. 17 is a block diagram schematically showing the arrangement of a program guide information producing apparatus in accordance with the sixth embodiment of the present invention.

FIG. 17 shows a schematic arrangement of the program guide information producing apparatus 102 in accordance with the sixth embodiment. The program guide information producing apparatus 102 comprises an inter-station self-produced information transmitting section 209 and an inter-station common program guide information receiving section 210 to perform direct communication between any two broadcasters. The inter-station self-produced information transmitting section 209 directly transmits self-produced common program guide information to other broadcasters. The inter-station common program guide information receiving section 210 directly receives other broadcaster's common program guide information from other broadcasters.

In this manner, the self-produced common program guide information generated in each broadcaster is directly transmitted to other broadcasters without using the program guide information collecting/transmitting apparatus 101. Thus, it becomes possible to reduce the operational cost such as the operator expenses required in using the program guide information collecting/transmitting apparatus 101. In other words, in the digital broadcasting system, transmission/reception of the common program guide information can be realized with a low operational cost.

Needless to say, it is possible to constitute the program guide information producing apparatus of the present invention by combining some of the arrangements mutually disclosed in above-described different embodiments.

EFFECTS OF THE INVENTION

As apparent from the above-described embodiments, the program guide information producing apparatus and the program guide information collecting/transmitting system have the following effects.

When the program guide information producing apparatus comprises the common program guide information producing section which is capable of generating the self-produced common program guide information, the present invention makes it possible to generate the self-produced common program guide information even when the program guide information collecting/transmitting system or the like is in trouble. Accordingly, each broadcaster can transmit its own TS containing the self-produced common program guide information without being adversely influenced by other systems.

Furthermore, when the self-produced common program guide information is united with other broadcaster's common program guide information so as to output all broadcasters' common program guide information (i.e., the united common program guide information), the present invention makes it possible to continuously maintain the "Continuity Counter" which serves as an index of TS packet continuity.

Furthermore, when the program guide information producing apparatus or the program guide information collecting/transmitting system comprises the common program guide information storing section, the common program guide information storing section stores other broadcaster's common program guide information corresponding to a pre-designated time duration in advance. Thus, the present invention makes it possible to continuously output the stored other broadcaster's common program guide information for the designated duration even when other broadcasting center system or the program guide information collecting/transmitting system is in trouble.

Furthermore, when the program guide information producing apparatus comprises the version number adding section, it becomes possible to eliminate the version jump even when the acquisition of other broadcaster's common program guide information has failed due to trouble in the network connecting the program guide information producing apparatus and the program guide information collecting/transmitting apparatus.

Furthermore, when the program guide information producing apparatus comprises the self-produced information stepwise transmitting section, the audio/video tape recording reservation function in each broadcast receiver can work properly even when the program guide information is suddenly changed.

Furthermore, when the program guide information producing apparatus comprises the self-produced information checking section, it becomes possible to check whether or not the information has been correctly transmitted to the program guide information collecting/transmitting apparatus, or it becomes possible to check whether or not the information has been modified or tampered by someone else.

Moreover, when the broadcasters have the capability of directly transmitting and receiving the common program guide information, it becomes possible to reduce the operational cost such as the operator expenses required in using the program guide information collecting/transmitting apparatus.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A program guide information producing apparatus, provided for a broadcaster, that has a capability of outputting self-produced common program guide information and other broadcaster's common program guide information, comprising:

a common program guide information producing section which produces self-produced common program guide information based on received program organizing information, a self-produced information transmitting section which receives said self-produced common program guide information from said common program guide information producing section and transmits said self-produced common program guide to a program guide information collecting/transmitting apparatus;

a common program guide information receiving section that receives other broadcaster's common program guide information from said program guide information collecting/transmitting apparatus; and a program guide information output section that receives said self-produced common program guide information from said common program guide information producing section and also receives other broadcaster's common program guide information from said common program guide information receiving section, and unites said self-produced common program guide information and said other broadcaster's common program guide information, and outputs the united common program guide information as all broadcasters' common program guide information to a TS multiplexing apparatus, wherein said program guide information output section outputs at least the self-produced common program guide information received from said common program guide information producing section when transmission of other broadcaster's common program guide information has failed.

2. The program guide information producing apparatus in accordance with claim 1, further comprising a common program guide information storing section which stores the other broadcaster's common program guide information corresponding to a designated time duration in advance.

3. The program guide information producing apparatus in accordance with claim 1, wherein said self-produced information transmitting section transmits only the information relating to broadcast time of programs to said program guide information collecting/transmitting apparatus.

4. The program guide information producing apparatus in accordance with claim 1, further comprising a version number adding section which adds a version number to said self-produced common program guide information and also to said other broadcaster's common program guide information.

5. The program guide information producing apparatus in accordance with claim 1, further comprising a self-produced information stepwise transmitting section which transmits control information prior to other information when renewed self-produced information is sent to a program guide information collecting/transmitting apparatus, said control information being used for audio/video recording preservation in a broadcast receiver.

6. The program guide information producing apparatus in accordance with claim 1, further comprising a self-produced information checking section which obtains and checks said self-produced common program guide information stored in a program guide information collecting/transmitting apparatus after said self-produced common program guide information is transmitted to said program guide information collecting/transmitting apparatus.

7. The program guide information producing apparatus in accordance with claim 1, further comprising:
   an inter-station self-produced information transmitting section which directly transmits said self-produced common program guide information; and
   an inter-station common program guide information receiving section which directly receives said other broadcaster's common program guide information from said other broadcaster.

8. The program guide information producing apparatus in accordance with claim 5, wherein said self-produced information stepwise transmitting section transmits only the control information relating to a presently broadcasted program to said program guide information collecting/transmitting apparatus prior to others among said control information relating to the audio/video recording preservation in the broadcast receiver.

* * * * *